(12) United States Patent
Sexton

(10) Patent No.: US 11,383,826 B2
(45) Date of Patent: Jul. 12, 2022

(54) AIRCRAFT LANDING GEAR COMPONENT

(71) Applicant: Safran Landing Systems UK LTD, Gloucester (GB)

(72) Inventor: Matthew Sexton, Gloucester (GB)

(73) Assignee: Safran Landing Systems UK LTD

(*) Notice: Subject to any disclaimer, the term of this patent is extended or adjusted under 35 U.S.C. 154(b) by 178 days.

(21) Appl. No.: 16/571,767

(22) Filed: Sep. 16, 2019

(65) Prior Publication Data

US 2020/0086979 A1 Mar. 19, 2020

(30) Foreign Application Priority Data

Sep. 17, 2018 (EP) ..................................... 18194812

(51) Int. Cl.
*B64C 25/20* (2006.01)
*B64C 25/00* (2006.01)
*B64C 25/34* (2006.01)

(52) U.S. Cl.
CPC ............ *B64C 25/20* (2013.01); *B64C 25/001* (2013.01); *B64C 25/34* (2013.01)

(58) Field of Classification Search
CPC ....... B64C 25/20; B64C 25/001; B64C 25/34; B64C 25/10; B64C 25/26; B33Y 80/00
See application file for complete search history.

(56) References Cited

U.S. PATENT DOCUMENTS

| 4,459,579 A | 7/1984 | David et al. | |
|---|---|---|---|
| 4,715,560 A * | 12/1987 | Loyek | B64C 1/062 |
| | | | 244/117 R |
| 6,308,916 B1 * | 10/2001 | Hrusch | B64C 25/22 |
| | | | 244/102 R |
| 9,145,197 B2 * | 9/2015 | Moselage, III | B64C 1/068 |
| 2004/0216805 A1 * | 11/2004 | Teufel | B64F 5/10 |
| | | | 141/11 |

(Continued)

FOREIGN PATENT DOCUMENTS

EP 2607058 A1 6/2013
FR 3035605 A1 11/2016

OTHER PUBLICATIONS

Extended European Search Report for European Application No. 18 194 812.6, dated Mar. 21, 2019, 7 pages.

(Continued)

*Primary Examiner* — Medhat Badawi
*Assistant Examiner* — Vicente Rodriguez
(74) *Attorney, Agent, or Firm* — RatnerPrestia

(57) ABSTRACT

An aircraft landing gear component having first and second base members, separated along a first longitudinal axis, a plurality of first parallel hoops, each first hoop lying along the first longitudinal axis and aligned in a plane oriented at a first non-zero angle to the first longitudinal axis, and a plurality of second parallel hoops, each second hoop lying along the first longitudinal axis and aligned in a plane oriented at a second non-zero angle to the first longitudinal axis, the second non-zero angle being different from the first non-zero angle, wherein each of the first hoops intersects with and is fixed to at least one of the second hoops, and wherein each of the second hoops intersects with and is fixed to at least one of the first hoops, such that the first and second hoops form a rigid structure extending between the first and second base members.

18 Claims, 8 Drawing Sheets

(56) References Cited

U.S. PATENT DOCUMENTS

2010/0065192 A1 3/2010 Wilson et al.
2010/0133382 A1* 6/2010 Pahl .................... B64C 3/22
  244/120
2013/0337207 A1* 12/2013 Mueller ............... B29C 70/326
  428/36.4

OTHER PUBLICATIONS

McDonnell Douglas Astronautics Company: "Isogrid Design Handbook", NASA Contractor Report, NASA CR-124075, Feb. 1, 1973, 252 pages.

* cited by examiner

AIRCRAFT LANDING GEAR COMPONENT

This application claims priority to European Patent Application No. EP 18194812.6, filed Sep. 17, 2018, which is incorporated herein by reference.

BACKGROUND OF THE INVENTION

The weight of an aircraft assembly can adversely affect fuel consumption of an aircraft of which it forms a part.

The present inventor has devised a new type of an aircraft landing gear component which can be of reduced weight in comparison to known corresponding aircraft landing gear components and can be incorporated into an aircraft landing gear assembly.

SUMMARY OF THE INVENTION

A first aspect of the invention provides an aircraft landing gear component comprising: a first base member and a second base member, separated along a first longitudinal axis, a plurality of first parallel hoops, each first hoop lying along the first longitudinal axis and aligned in a plane oriented at a first non-zero angle to the first longitudinal axis, and a plurality of second parallel hoops, each second hoop lying along the first longitudinal axis and aligned in a plane oriented at a second non-zero angle to the first longitudinal axis, the second non-zero angle being different from the first non-zero angle, wherein each of the first hoops intersects with and is fixed to at least one of the second hoops, and wherein each of the second hoops intersects with and is fixed to at least one of the first hoops, such that the first and second hoops form a rigid structure extending between the first and second base members.

With such an arrangement, there is provided an aircraft landing gear component having a geodetic shape and having a lower weight.

The aircraft landing gear component can further comprise at least one elongate member aligned with the first longitudinal axis, the elongate member intersecting with and being fixed to one or more of the first hoops and one or more of the second hoops. With such an arrangement, the component can have better bending stiffness.

The first and second hoops can form a cylindrical part of the aircraft landing gear component.

The aircraft landing gear component can further comprise: a third base member, separated from the second base member along a second longitudinal axis, a plurality of third parallel hoops, each third hoop being distributed along the second longitudinal axis and aligned in a plane oriented at a third non-zero angle to the second longitudinal axis, and a plurality of fourth parallel hoops, each fourth hoop being distributed along the second longitudinal axis and aligned in a plane oriented at a fourth non-zero angle to the second longitudinal axis, the fourth non-zero angle being different from the third non-zero angle, wherein each of the third hoops intersects with and is fixed to at least one of the fourth hoops, and wherein each of the fourth hoops intersects with and is fixed to at least one of the third hoops, such that the third and fourth hoops form a rigid structure extending between the second and third base members.

With such an arrangement, the aircraft landing gear component can be suitable for a greater range of applications.

The aircraft landing gear component can further comprise at least one second elongate member aligned with the second longitudinal axis, the second elongate member intersecting with and being fixed to one or more of the third hoops and one or more of the fourth hoops. With such an arrangement, the component can have better bending stiffness.

The third and fourth hoops can form a cylindrical part of the aircraft landing gear component.

The first and second longitudinal axes can lie along the same line. With such an arrangement, the component can provide a more simple linkage.

The aircraft landing gear component can further comprise a bearing for coupling to an airframe or to a second aircraft landing gear component. With such an arrangement, the aircraft landing gear can be used as a bogie beam or a strut.

At least one of the base members can define the bearing.

The first, second and third base members can each define at least one bearing. This might make the aircraft landing gear component particularly suited to use as a bogie beam.

The component can comprise a bogie beam.

The component can further comprise a covering, the covering surrounding the first and second pluralities of hoops. Alternatively, the covering can cover only a single plurality of hoops. The covering can reduce aeroacoustic noise generated by the component.

The covering can comprise a structural part of the component. This can allow the overall component to be made more lightweight.

A second aspect of the invention provides a landing gear comprising: a first part arranged to connect to an aircraft, a second part arranged to contact the ground, and an aircraft landing gear component according to the first part.

A third aspect of the invention provides a method according to claim 15.

In a fourth aspect of the invention, the component can comprise an aircraft assembly component arranged to form part of an aircraft assembly distinct from a landing gear assembly. Optional features of the first aspect can be applied to the aircraft assembly component of the fourth aspect in an analogous manner.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
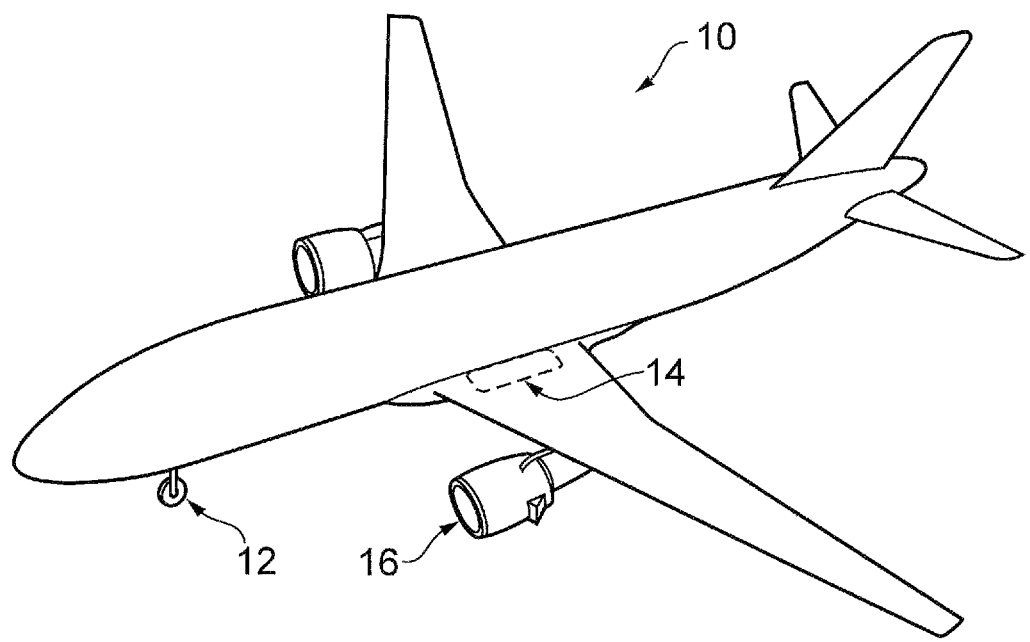
FIG. 1 is a diagram of an aircraft.

FIG. 1 is a diagram of an aircraft 10. The aircraft 10 includes assemblies such as a nose landing gear 12, main landing gear 14 and engines 16. Other aircraft assemblies will be apparent to the skilled person. An aircraft assembly can be a group of interconnected parts which are arranged to be fitted to one or more other aircraft assemblies as a unit. The term aircraft as used herein includes aeroplanes, helicopters, UAVs and the like.

Referring now to FIGS. 2a to 2e, an aircraft assembly, namely an aircraft landing gear assembly, is shown generally at 14. The landing gear assembly 14 includes a foldable stay 18, a lock link 20 and a down lock spring assembly 22 mounted to the stay 18 and arranged to urge the lock link 20 to assume a locked state. The landing gear assembly also includes a main shock absorber strut 24, comprising a main fitting 26 and a sliding tube 28, as well as a pair of wheel and brake assemblies 30 pivotally coupled to a lower end of the sliding tube 28 via an elongate bogie beam 29.

The aircraft landing gear assembly is movable between a deployed condition, for take-off and landing, and a stowed condition for flight. An actuator (not shown) is provided for moving the landing gear between the deployed condition and the stowed condition. This actuator is known in the art as a retraction actuator, and more than one can be provided. A retraction actuator can have one end coupled to the airframe and another end coupled to the main strut such that extension and retraction of the actuator results in movement of the main strut between deployed and stowed conditions.

Figure 2A:
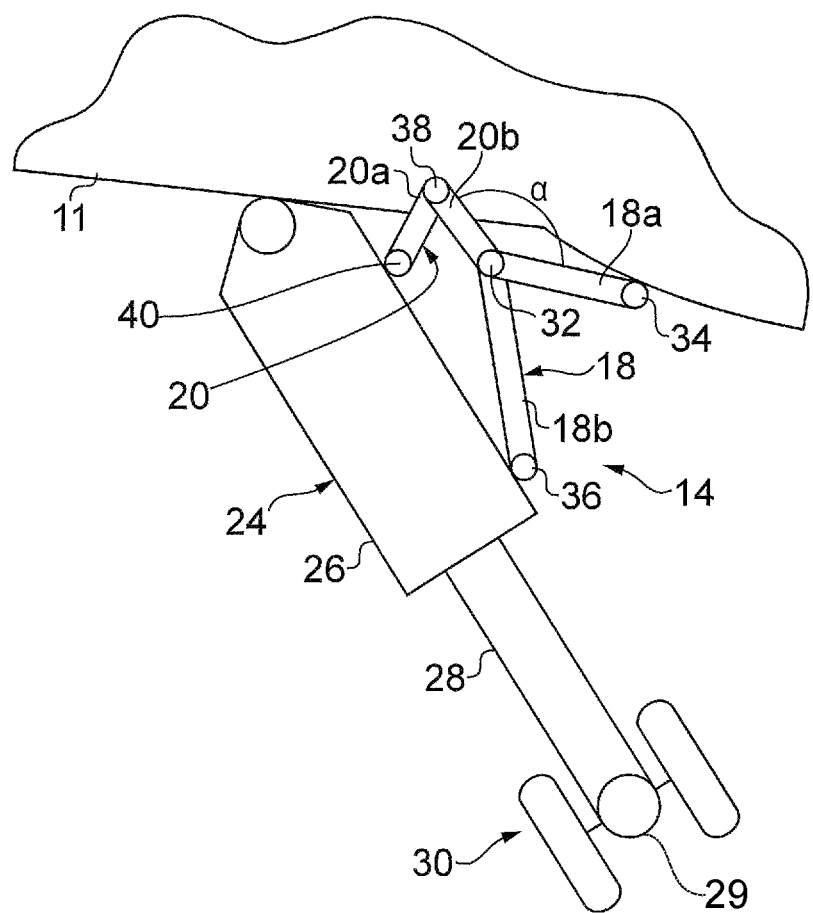
FIGS. 2a to 2e are diagrams an aircraft landing gear assembly.

The stay 18 serves to support the orientation of the main fitting 26 when the landing gear is in the deployed condition. The stay 18 generally includes a two bar linkage that can be unfolded to assume a generally straight or aligned, over centre condition in which the stay 18 is locked to inhibit movement of the main fitting, as shown in FIGS. 2c and e. When the stay is broken, it no longer prevents pivotal movement of the main fitting 26 and the main fitting 26 can be moved by the retraction actuator towards the stowed condition, as shown in FIG. 2a. During flight the stay 18 is arranged in the folded condition, while during take-off and landing the stay 18 is arranged in the generally straight or aligned condition. Some main landing gear assemblies include a pair of stays coupled to a common shock absorbing strut.

The stay 18 has an elongate upper stay arm 18a having a lower end defining a pair of lugs pivotally coupled via a pivot pin 32 to a pair of lugs defined at an upper end of an elongate lower stay arm 18b. The stay arms 18a and 18b can therefore pivotally move relative to one another about the pivot pin 32. The upper end of the upper stay arm 18a defines a pair of lugs that are pivotally coupled to a lug of a connector 34 which in turn is pivotally coupled to the airframe 11. The lower end of the lower stay arm 18b defines a pair of lugs pivotally coupled to a lug of a connector 36 which in turn is pivotally coupled to the main fitting 26.

The lock link 20 has an elongate upper link arm 20a having a lower end pivotally coupled to an upper end of an elongate lower link arm 20b via a pivot pin 38. The link arms 20a, 20b can therefore pivotally move relative to one another about the pivot pin 38. An upper end of the upper link arm 20a defines a pair of lugs that are pivotally coupled to a lug of a connector 40 which in turn is pivotally coupled to the main strut 26. A lower end of the lower link arm 20b defines a lug that is pivotally coupled to lugs of the stay arms 18a, 18b via the pivot pin 32. Lugs of the upper stay arm 18a are disposed between the lugs of the lower stay arm 18b and the lugs of the lower link arm 20b.

Figure 2B:
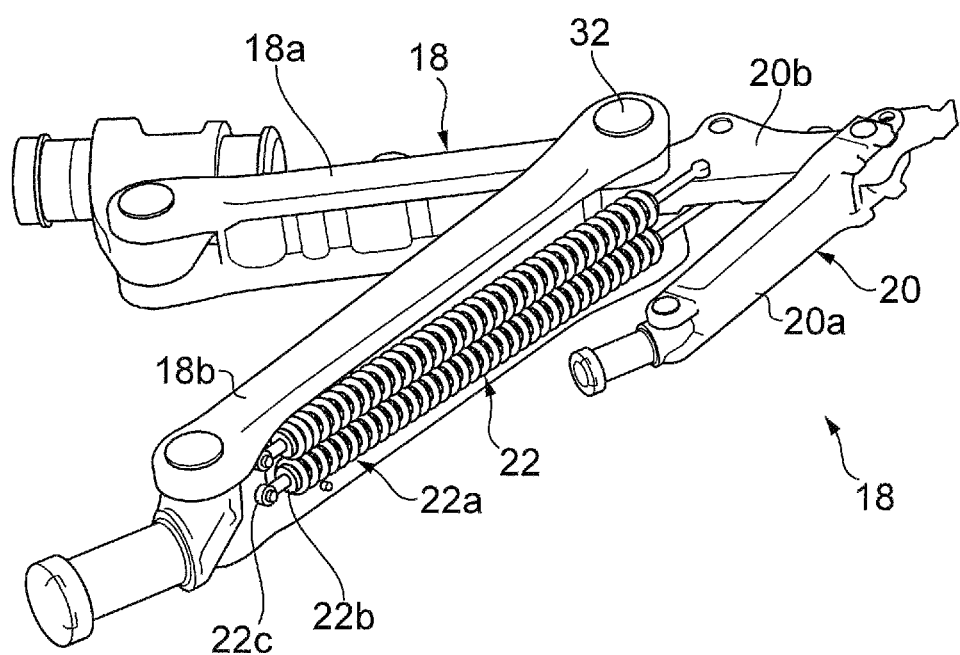
Figure 2C:
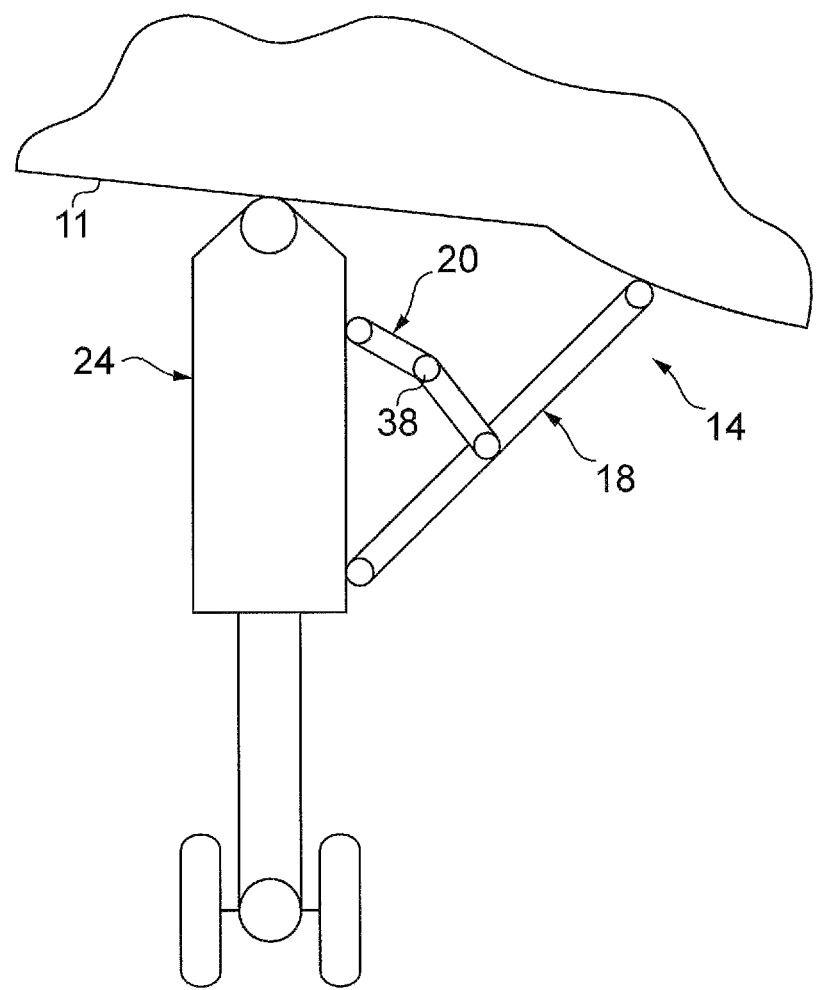
Figure 2D:
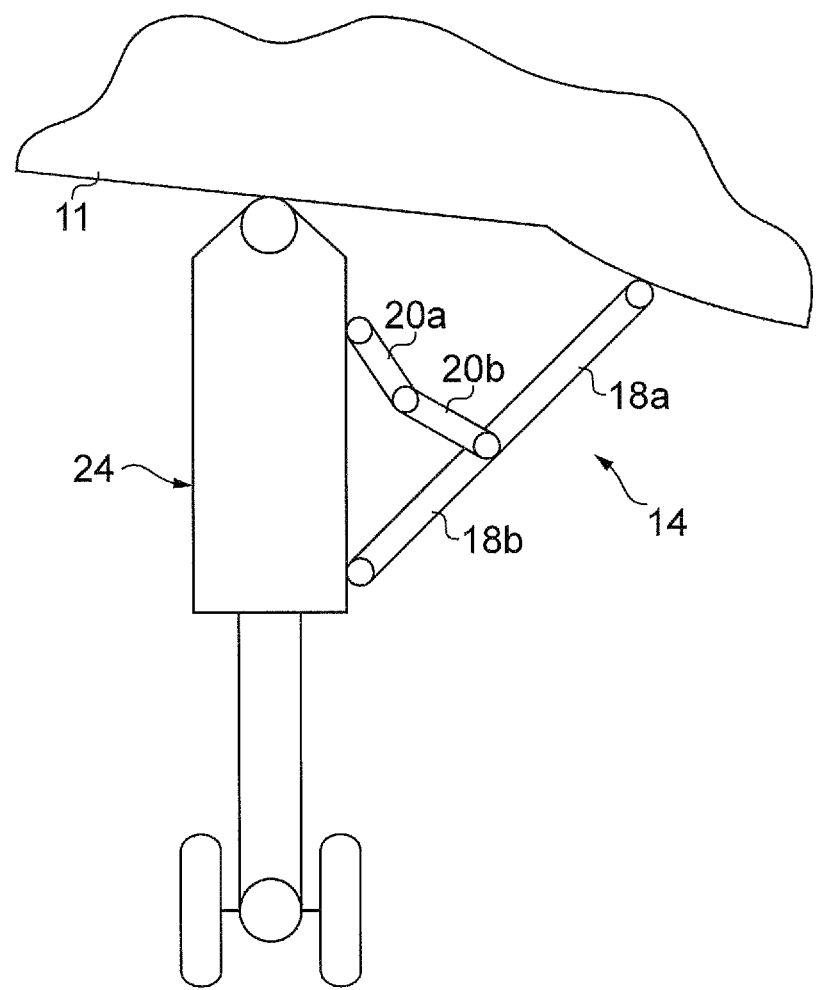
Figure 2E:
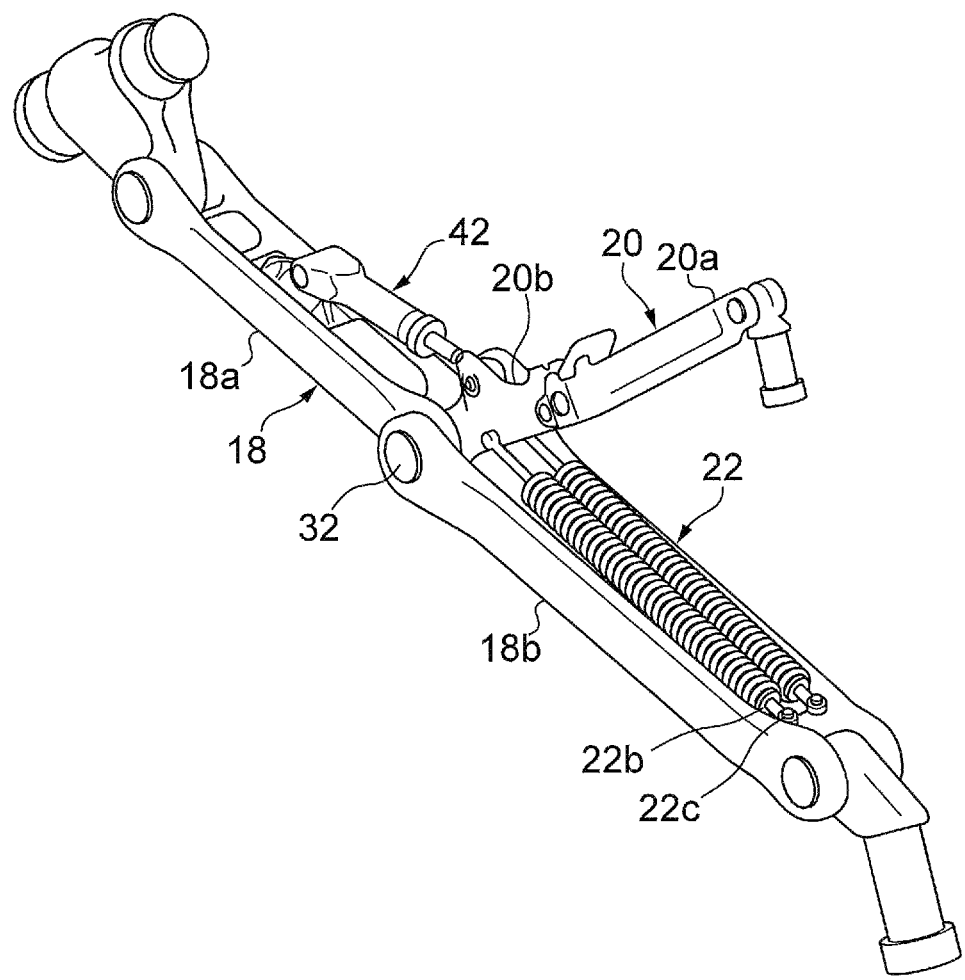

When the lock link 20 is in the locked condition, as illustrated in FIGS. 2d and 2e, the upper and lower link arms 20a, 20b are generally longitudinally aligned or coaxial, and can be 'over-centre', such that the lock link 20 is arranged to oppose a force attempting to fold the stay 18, so as to move the landing gear assembly from the deployed condition towards the stowed condition. The lock link 20 must be broken to enable the stay 18 to be folded, thereby permitting the main fitting 26 to be moved by the retraction actuator towards the stowed condition.

One or more down lock springs 22 are generally provided to assist in moving the landing gear assembly to the deployed condition and locking it in that state by making the lock link. Down lock springs 22 also inhibit the lock link accidentally being unlocked. Down lock springs 22 are generally titanium alloy coil springs, which can be coupled between the lock link and another part of the landing gear assembly, such as an arm of the stay assembly, as shown in FIGS. 2b and 2e.

The spring assembly 22 is arranged to bias the lock link 20 towards the locked condition by way of spring tension. A distal end of the spring 22a is coupled to the lower stay arm 18b via a lower engagement formation 22b which in turn is coupled to an anchor point defined by the lower connector 22c.

The coil spring of the spring assembly 26 is at its shortest when the landing gear assembly is in the deployed condition, as shown in FIG. 2e, and at its longest when the landing gear assembly approaches the stowed condition, as shown in FIG. 2b. As the landing gear assembly is retracted towards the stowed condition, the spring of each spring assembly extends, resulting in increased spring load and torsional stress.

Referring to FIG. 2e, a lock stay actuator 42 is coupled between the upper stay arm 18a and lower link arm 20b and is arranged to pivotally move the link arms 20a, 20b so as to 'lock' and 'unlock' the lock link 20, as illustrated in FIG. 2c. The actuator 42 can break the lock link 20 against the down lock spring bias, allowing the landing gear assembly to be folded and stowed as described previously.

As will be appreciated from the above, various aircraft assemblies include a structural element which, in use, is arranged to directly or indirectly react load applied to it by another assembly of the aircraft; for example, an outer cylinder (main fitting) or inner cylinder (sliding tube) of an aircraft assembly shock absorbing strut, a bogie or truck beam, side stays or lock stays, axles and wheel levers.

Figure 3:
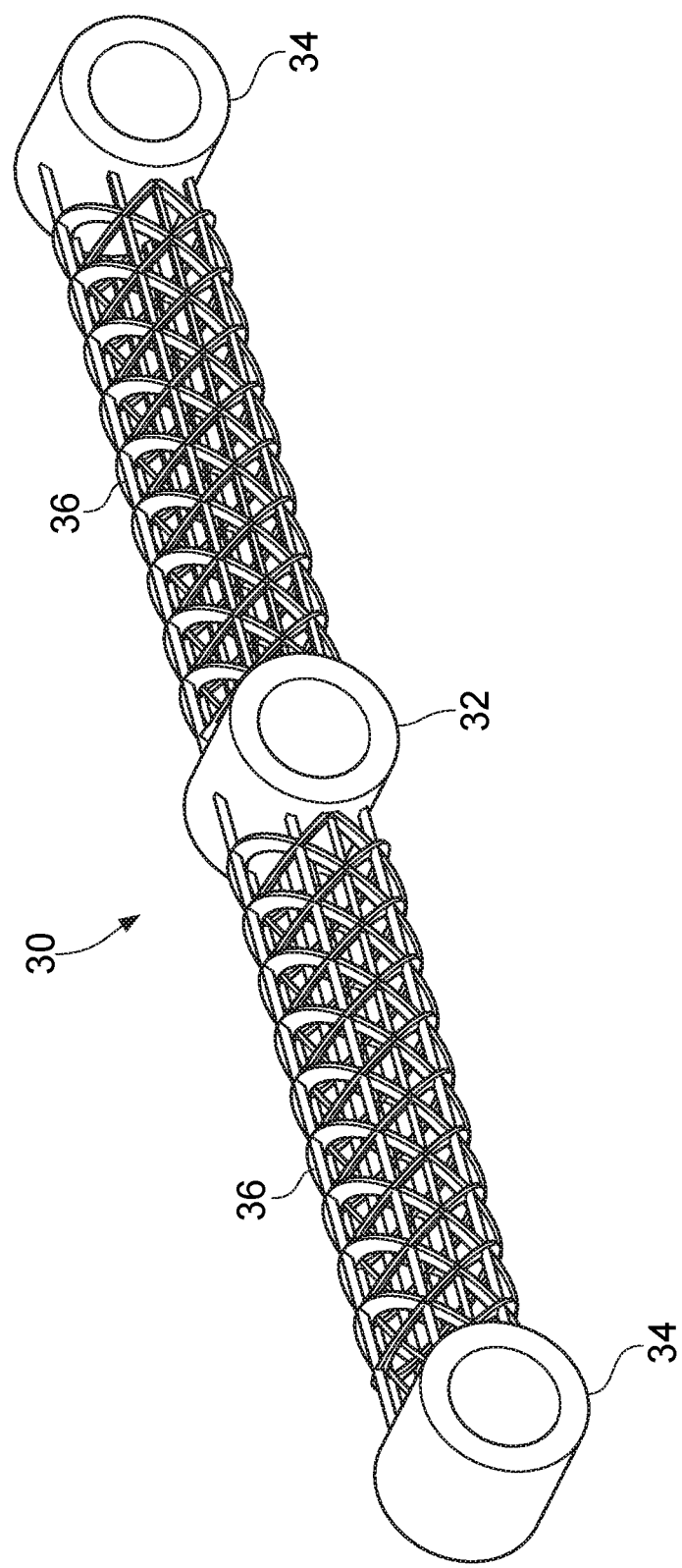
FIG. 3 is a diagram of a landing gear component according to an embodiment of the invention.

Referring now to FIG. 3, a landing gear component according to an embodiment of the invention is shown generally at 30.

In this example, the assembly 30 is a bogie beam 30.

The bogie beam 30 comprises a centrally located primary bearing 32. The primary bearing 32 is in the form of a cylinder which extends transversely across the bogie beam 30 and is open at both ends to define a bore for receiving a bogie hinge pin, via which the bogie beam 30 can be pivotally coupled to a sliding tube of a shock absorbing strut.

The bogie beam 30 further comprises a pair of axle bearings 34. Each axle bearing 34 is in the form of a cylinder which extends transversely across the bogie beam 30 and is open at both ends to define a bore for receiving an axle, on which wheel and brake assemblies can be mounted.

The primary bearing 32 is connected to the axle bearings 34 by elongate beam sections 36.

While the above-described embodiment refers to a bogie beam, the present disclosure is adaptable to be used in relation to other landing gear components such as the structural elements described above. When used with other landing gear components, the number of bearings can be different from 3, the elongate beam sections 36 can number either greater or fewer than two and any elongate beam sections need not be aligned as shown in FIG. 3, but can be perpendicular for example.

Figure 4:
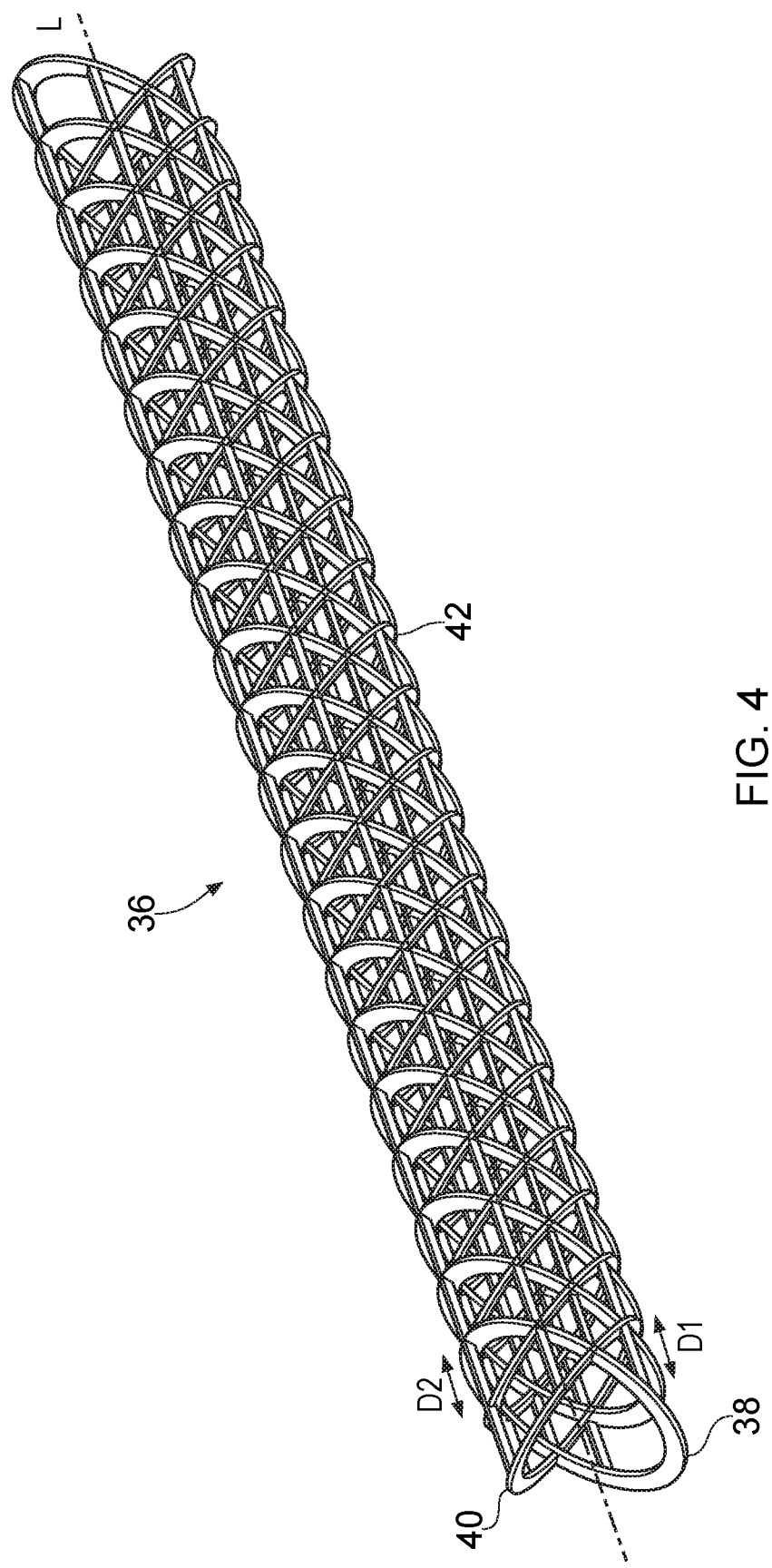
FIG. 4 is a magnified view of part of the landing gear component of FIG. 3.

Referring additionally to FIG. 4, each elongate beam section 36 is formed by a plurality of intersecting hoops to generally define a generally cylindrical shape. Each elongate beam section 36 has a longitudinal axis L.

More specifically, a plurality of first hoops 38 are orientated at 45° to the longitudinal axis L of the bogie beam 30. A plurality of second hoops 40 are orientated at 135° to the longitudinal axis L of the bogie beam 30 so as to be orientated at 90° to the first hoops 38. The first hoops 38 are axially separated from one another by a first distance D1. The second hoops 40 are axially separated from one another by a second distance D2, which in this embodiment is equal to the first distance D1.

The elongate beam section 36 also has a stringer 42, which is a straight member that intersects both the first hoops 38 and the second hoops 40. In the embodiment shown in FIGS. 3 and 4, there are 8 stringers 42. However, different numbers of stringers 42 can be used.

In an alternative embodiment, the first hoops 38, the second hoops 40 and the stringers 42 can be arranged so as to define, in negative space between the features, approximately equilateral triangles on the surface of the generally cylindrical shape.

The elongate beam section 36 can be covered with a covering (not shown). Such a covering can be a structural, plated surface which increases the structural rigidity of the elongate beam section 36. The covering can also be non-structural and can improve the aerodynamic properties of the landing gear component 30.

It will be understood that the first hoops 38, the second hoops 40 and the stringers 42 can all be formed simultaneously using an additive layer manufacturing process. Such a process would have the effect that the first hoops 38, the second hoops 40 and the stringers 42 can intersect without any join lines, and can form a continuous structure.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention can be implemented by means of hardware comprising several distinct elements. In a device claim enumerating several parts, several of these parts can be embodied by one and the same item of hardware. The mere fact that certain measures are recited in mutually different dependent claims does not indicate that a combination of these measures cannot be used to advantage.

The invention claimed is:

1. An aircraft landing gear component comprising:
a first base member and a second base member, separated along a first longitudinal axis;
a plurality of parallel first hoops, wherein the first hoops are distributed along the first longitudinal axis and each first hoop is aligned in a respective first hoop plane oriented at a first non-zero angle relative to the first longitudinal axis, wherein each respective first hoop plane is parallel to each other respective first hoop plane and spaced from each other respective first hoop plane along the first longitudinal axis; and
a plurality of parallel second hoops, wherein the second hoops are distributed along the first longitudinal axis and each second hoop is aligned in a respective second hoop plane oriented at a second non-zero angle relative to the first longitudinal axis wherein each respective second hoop plane is parallel to each other respective second hoop plane and spaced from each other respective second hoop plane along the first longitudinal axis, and wherein the second non-zero angle relative to the first longitudinal axis is different in magnitude than the first non-zero angle relative to the first longitudinal axis;
wherein each of the first hoops intersects with and is fixed to at least one of the second hoops;
wherein each of the second hoops intersects with and is fixed to at least one of the first hoops; and
wherein the first hoops and the second hoops form a structure extending between and connected to the first base member and the second base member.

2. The aircraft landing gear component of claim 1, further comprising at least one elongate member aligned with the first longitudinal axis, wherein the elongate member intersects with and is fixed to one or more of the first hoops and one or more of the second hoops.

3. The aircraft landing gear component of claim 1, wherein the first hoops and the second hoops form a cylindrical portion of the aircraft landing gear component.

4. The aircraft landing gear component of claim 1, further comprising:
a third base member, separated from the second base member along a second longitudinal axis;
a plurality of parallel third hoops, wherein the third hoops are distributed along the second longitudinal axis and each third hoop is aligned in a respective third hoop plane oriented at a third non-zero angle relative to the second longitudinal axis, wherein each respective third hoop plane is parallel to each other respective third hoop plane and spaced from each other respective third hoop plane along the second longitudinal axis; and
a plurality of parallel fourth hoops, wherein the fourth hoops are distributed along the second longitudinal axis and each fourth hoop is aligned in a respective fourth hoop plane oriented at a fourth non-zero angle relative to the second longitudinal axis, wherein each respective fourth hoop plane is parallel to each other respective fourth hoop plane and spaced from each other respective fourth hoop plane along the second longitudinal axis, and wherein the fourth non-zero angle relative to the second longitudinal axis is different in magnitude than the third non-zero angle relative to the second longitudinal axis;
wherein each of the third hoops intersects with and is fixed to at least one of the fourth hoops;
wherein each of the fourth hoops intersects with and is fixed to at least one of the third hoops; and
wherein the third hoops and the fourth hoops form a structure extending between and connected to the second base member and the third base member.

5. The aircraft landing gear component of claim 4, further comprising at least one second elongate member aligned with the second longitudinal axis, wherein the second elongate member intersects with and is fixed to at least one third hoop and at least one fourth hoop.

6. The aircraft landing gear component of claim 4, wherein the third hoops and the fourth hoops form a cylindrical portion of the aircraft landing gear component.

7. The aircraft landing gear component of claim 4, wherein the first longitudinal axis and the second longitudinal axis lie along the same line.

8. The aircraft landing gear component of claim 1, further comprising at least one bearing configured to couple to a second aircraft landing gear component.

9. The aircraft landing gear component of claim 8, wherein at least one of the base members defines the bearing.

10. The aircraft landing gear component of claim 4, wherein the first base member, the second base member, and the third base member each defines at least one bearing configured to couple to another aircraft landing gear component.

11. The aircraft landing gear component of claim 1, wherein the aircraft landing gear component is a bogie beam.

12. The aircraft landing gear component of claim 1, further comprising a covering, the covering surrounding the first hoops and the second hoops.

13. The aircraft landing gear component of claim 12, wherein the covering comprises a structural part of the aircraft landing gear component.

14. A landing gear comprising:
a first part arranged to connect to an aircraft,
a second part arranged to contact the ground, and
an aircraft landing gear component comprising:
a first base member and a second base member, separated along a first longitudinal axis,
a plurality of parallel first hoops, wherein the first hoops are distributed along the first longitudinal axis and each first hoop is aligned in a respective first hoop plane oriented at a first non-zero angle relative to the first longitudinal axis, wherein each respective first hoop plane is parallel to each other respective first hoop plane and spaced from each other respective first hoop plane along the first longitudinal axis; and
a plurality of parallel second hoops, wherein the second hoops are distributed along the first longitudinal axis and each second hoop is aligned in a respective second hoop plane oriented at a second non-zero angle relative to the first longitudinal axis, wherein each respective second hoop plane is parallel to each other respective second hoop plane and spaced from each other respective second hoop plane along the first longitudinal axis, and wherein the second non-zero angle relative to the first longitudinal axis is different in magnitude than the first non-zero angle relative to the first longitudinal axis;
wherein each of the first hoops intersects with and is fixed to at least one of the second hoops;
wherein each of the second hoops intersects with and is fixed to at least one of the first hoops; and
wherein the first hoops and the second hoops form a structure extending between and connected to the first base member and the second base member.

15. The aircraft landing gear component of claim 1, further comprising a plurality of elongate members disposed around the first longitudinal axis, wherein each elongate member is aligned with the first longitudinal axis, and wherein each elongate member intersects with and is fixed to a plurality of the first hoops and to a plurality of the second hoops.

16. The aircraft landing gear component of claim 1, wherein at least five of the first hoops each intersect with and are fixed to a respective group of at least five of the second hoops.

17. The aircraft landing gear component of claim 1, wherein the first non-zero angle is 45 degrees and the second non-zero angle is 135 degrees.

18. The aircraft landing gear of claim 1, wherein the plurality of parallel first hoops comprises at least eight first hoops and the plurality of parallel second hoops comprises at least eight second hoops.

* * * * *